PROCESS FOR CONSTRUCTING THIN FILM INDUCTORS

Filed Sept. 27, 1967 2 Sheets-Sheet 1

INVENTOR
BRUCE N. OGSTON

BY Charles H. Curry
ATTORNEY

PROCESS FOR CONSTRUCTING THIN FILM INDUCTORS

Filed Sept. 27, 1967 2 Sheets-Sheet 2

INVENTOR
BRUCE N. OGSTON

BY [signature]
ATTORNEY

United States Patent Office 3,508,457
Patented Apr. 28, 1970

3,508,457

PROCESS FOR CONSTRUCTING THIN FILM INDUCTORS

Bruce N. Ogston, Ventura, Calif., assignor to the United States of America as represented by the Secretary of the Navy Filed Sept. 27, 1967, Ser. No. 671,156
Int. Cl. B23b 3/00
U.S. Cl. 82—1 2 Claims

ABSTRACT OF THE DISCLOSURE

A method of manufacturing a thin film inductor from a thin electrical conducting film deposited on the front plane surface of a glass substrate. The back plane surface of the substrate is mounted on a face plate that is rotated along a rotational axis that is perpendicular to and passes through the center of the plane surface of the thin film. A spiral strip is removed from the thin film by simultaneously applying a spring tool against the front plane of the glass substrate and moving the spring tool radially outward at a predetermined rate on the front plane of the substrate and along a radius perpendicular to the axis of rotation. The spring tool accommodates any misalignment in mounting the plane of the substrate perpendicular to the axis of rotation. In another embodiment a rigid tool is used and a pliable material is inserted between the glass substrate and the face plate to accommodate any misalignments.

The invention described herein may be manufactured and used by or for the Government of the United States of America for governmental purposes without the payment of any royalties thereon or therefor.

The present invention relates to a method for manufacturing thin film inductors and more particularly a method for making thin film inductors that involves the removal of a thin conducting film from a dielectric substrate.

The previous methods employed for producing thin film inductors have generally required fairly complex equipment and have been relatively expensive to operate. One such method has been the use of complex masking and depositing techniques which increases the time of manufacture and the cost of materials. Usually the masks are incorporated into the inductor which increases the size and weight of the inductor device without adding to its efficiency or performance.

Accordingly, an object of the present invention is to provide a method for manufacturing thin film inductors which is economic and provides a highly efficient inductor of relatively small size and weight.

Briefly, in one embodiment of the present invention the inductor is made from thin aluminum film deposited on a glass substrate by conventional techniques. After a uniform film has been deposited on the glass substrate, the substrate is mounted on a face plate or jig which is then mounted on a rotating device which can rotate the face plate. This mounting is performed in such a manner that the center of the aluminum film is centered on the rotational axis of the rotating device and the plane of the substrate is perpendicular to the axis of rotation. A scribing tool having a tip diameter of about 0.005 inch is brought into contact against the substrate at a point which is about 1/16 inch from the axis of rotation. The device is then rotated at a rate of about 25 to 100 revolutions per minute, depending upon the type of film material, film thickness and tool tip geometry. The cross-feed of the tool is adjusted to move the tool radially outward in the plane of the substrate at a rate of about 0.015 inch per revolution of the rotating device. The rotating device continues to rotate a predetermined number of revolutions thereby scribing the film for a predetermined length. During this operation a jet of air is directed onto the tool tip to remove any buildup of aluminum film. Indium droplets are used to connect copper leads to the outer edge of the film and to the center circular portion of the film formed by the initial offset of the scribing tool. In one embodiment a spring tool is used to remove the thin film. This tool absorbs any misalignment in mounting the substrate and thereby prevents fracture of the glass from which the substrate is made. In another embodiment the scribing tool is rigid and the glass substrate is mounted on a pliable backing material which can be moved slightly by the scribing tool to compensate for any misalignment in mounting the substrate.

Other objects and many of the attendant advantages of this invention will be readily appreciated as the same becomes better understood by reference to the following detailed description when considered in connection with the accompanying drawings wherein.

Figure 1:
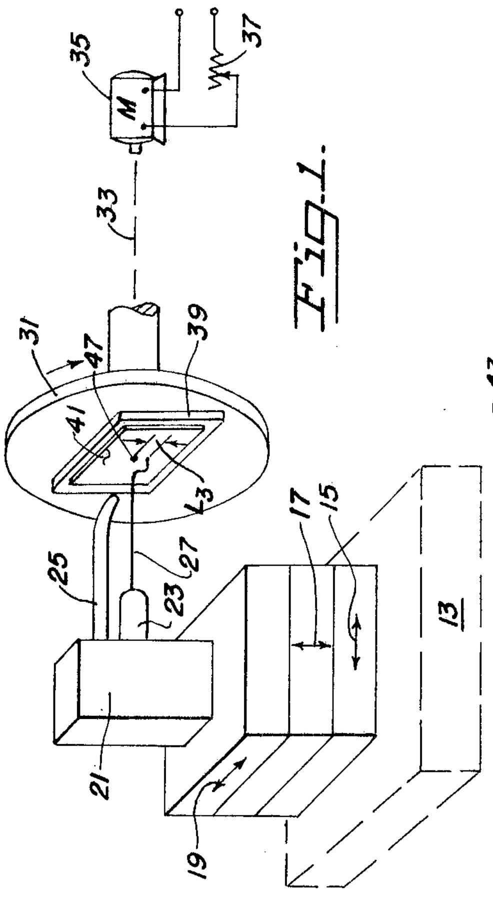
FIG. 1 is a schematic diagram illustrating one embodiment of the present invention.
Figure 3:
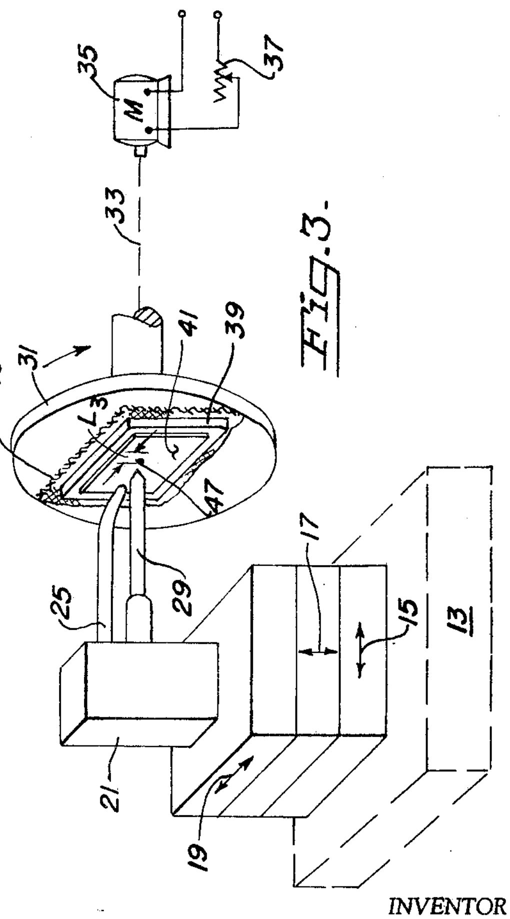
FIG. 3 is a schematic diagram illustrating another embodiment of the present invention.

In FIG. 1 is illustrated one embodiment of the present invention and in FIG. 3 is illustrated another embodiment of the present invention. The devices and methods illustrated in FIGS. 1 and 3 will be described together wherein like reference numerals will refer to like elements of each embodiment. Referring now to FIGS. 1 and 3, an adjustable tool mounting mechanism 11 is used to hold the scribing tools and includes mounting plate 13, illustrated in dotted lines, horizontal motion mechanism 15, vertical motion mechanism 17 and lateral motion mechanism 19. Operatively connected to lateral motion mechanism 19 is tool mounting fixture 21 which may be moved in the horizontal, vertical and lateral directions by mechanisms 15, 17 and 19, respectively. The direction in which each of these mechanisms is moved is illustrated by the arrow associated with each mechanism. Since there are many types of mechanisms which may provide these three motions and since the type is not critical, a description of the particular operation of each mechanism is not provided. Mounted on tool mounting fixture 21 is tool holding device 23 and air conduit 25. In the FIG. 1 embodiment a spring tool 27 is mounted in tool holding device 23 and in the FIG. 3 embodiment a rigid tool 29 is mounted in tool holding device 23. The air from air conduit 25 is directed against the tip of the cutting tool to remove any buildup of material during operation. The flow rate of air, the diameter of the nozzle and the distance of the nozzle from the tip of the tool will vary depending upon such factors as the type of material being removed and its rate of removal. Face plate 31 is mounted on and secured to shaft 33 which is driven by motor 35 that is regulated in speed by variable resistor device 37. The direction of rotation is illustrated in each of these embodiments by the arrows associated with the base plate. However, it is to be understood that this direction of rotation may be opposite from that shown since it is not critical to operation.

Figure 2:
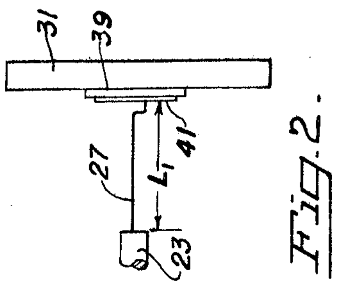
FIG. 2 is a side elevation of the cutting tool, face plate and inductor device of FIG. 1.

Referring now to FIGS. 1 and 2 of the drawing there is illustrated substrate 39, that is preferably made of glass, which is directly mounted on the flat surface of face plate 31. This mounting may be achieved by various types of adhesives that rigidly attach the substrate to the face plate and permits its removal by the use of sufficient force, solvents or other techniques. The force exerted by spring tool 27 perpendicular to the surface of substrate 39 is quite small, for example, from several ounces to several pounds, depending upon the type of film material, film thickness and tool tip geometry. This results in a very small drag force and therefore only a small amount of adhesive is necessary to prevent relative motion between substrate 39 and face plate 31. This small amount of adhesive is advantageous since it permits easy removal of the substrate. On the upper surface of glass substrate 39 is deposited a thin aluminum film 41. Typical thin film thickness is about 0.1 to 10 microns. However, it is to be understood that other thicknesses and types of materials may be used provided they are current conducting materials, are suitable for a thin film inductor, and are suitable for removal in the manner described. Spring tool 27 preferably has a length $L_1$ of about 1-inch and is made of piano wire having a diameter of about .030 to .040 inch. This tool may have different configurations; however, the one illustrated in FIG. 1 has been found quite suitable for the purposes described.

Figure 4:
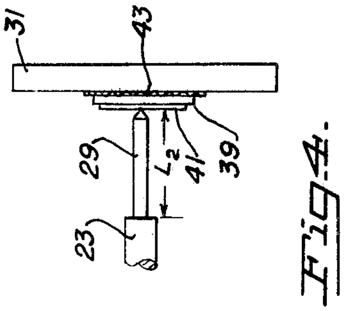
FIG. 4 is a side elevation of the cutting tool, face plate and inductor device of FIG. 3.

In FIGS. 3 and 4 are illustrated another embodiment of the present invention in which tool 29 is rigid and substrate 39 is mounted directly on backing material 43. Backing material 43 is preferably a pliable or resilient material, which does not possess rigid characteristics, such as relatively thick cloth. Substrate 39 is attached to backing 43 and backing 43 is attached to face plate 31 by suitable adhesive materials. The length $L_2$ of tool 29 of FIG. 4 is not critical; however, a length of about 1-inch has been found to be satisfactory. Spring tool 27 of FIG. 1 and rigid tool 29 of FIG. 3 preferably have tip diameters of about 0.005 inch. However, it is to be understood that different tip diameters may be used depending upon the width of cut desired for the particular inductive device in question.

Figure 5A:
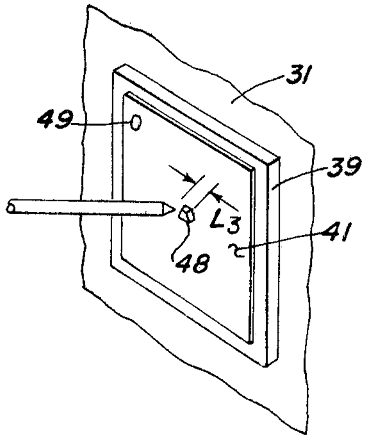
FIGS. 5A through 5C illustrate the method of manufacturing the inductor device of the present invention.
Figure 5B:
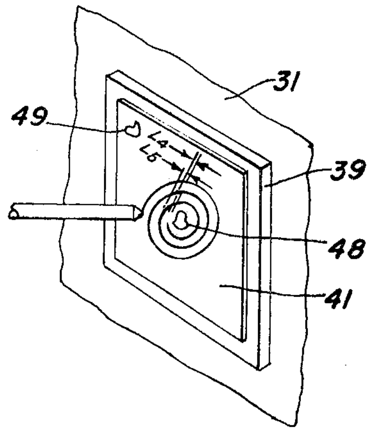
Figure 5C:
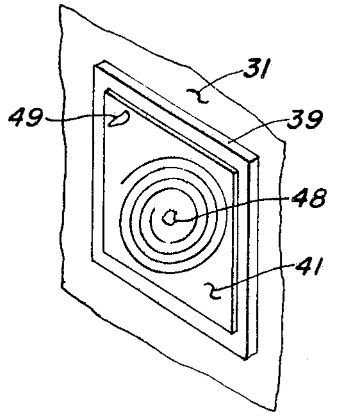

The operation of the present invention will now be described in connection with FIGS. 1 through 5C. Referring to FIG. 5A, an indium droplet 48 is first deposited at the approximate center of thin film 41 which is also coincident to the axis of rotation of face plate 31. This axis of rotation is illustrated by reference numeral 47 in FIGS. 1 and 3. Another indium droplet 49 is deposited on the outer periphery of thin film 41. Indium is preferably used because it has the characteristics of wetting glass and copper as a solder. It may be applied with a typical soldering pencil before deposition of the film. After the indium droplets have been deposited on the thin film, substrate 39 is mounted on the face plate 31 of the rotating device. The tip of spring tool 27 of FIG. 1 and the tip of rigid tool 29 of FIG. 3 are mounted about 1/16 of an inch from the axis of rotation or point 47 of face plate 31. This distance is illustrated by reference character $L_3$. The purpose of this offset $L_3$ is to permit sufficient surface area for the indium droplet to be mounted and not interfere with the scribing or metal removal operation. The next steps are to bring the tool into contact with the substrate 39 and then initiate rotation of face plate 31. The speed of rotation of face plate 31 may be varied depending upon the type of film 41 that is being removed and its thickness. Referring to FIG. 1, at the start of rotation of the face plate 31, adjustable tool mounting mechanism 11 moves spring tool 27 downward by actuating vertical motion mechanism 17 at a rate of about 0.015 inch per revolution. In FIG. 3 the adjustable tool mounting mechanism 11 moves rigid tool 29 to the left in the horizontal direction by actuating lateral motion mechanism 19 at a rate of about 0.015 inch per revolution. It is important to move the tools in the above described direction so that a uniform spiral of removed thin film material will result. To move the tools in other directions would result in undesirable non-uniform spirals or physical contact of the cutting tools with the center positioned indium droplets. The scribing operation is therminated when the tool is in close proximity to the outer edge of the thin film or it may be terminated earlier if it is desired to have an inductor with fewer turns. From FIG. 5B it can be seen that, for the operation described, the width ($L_4$) of the material removed by the tool is 0.005 inch and that the width ($L_5$) of the remaining material is about 0.010. Depending upon the particular needs these dimensions may be varied provided such variations are compatible with the teachings of the present invention.

Figure 6:
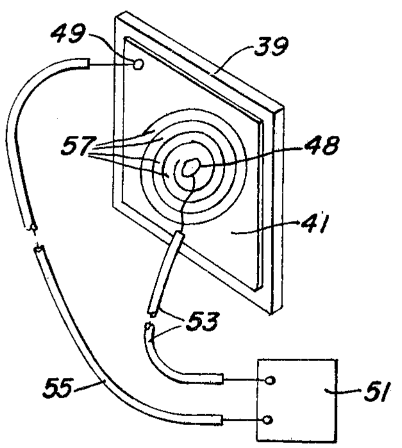
FIG. 6 is a schematic drawing of the completed inductor device.

In FIG. 6 is illustrated the inductor device manufactured in accordance with the present invention. The inductor device is connected to electrical circuit 51 by means of lead wires 53 and 55 which are respectively connected to indium droplets 48 and 49. It can be seen that the conductor path is from indium droplet 48, spirally outward through the unremoved thin film strips 57, to indium droplet 49, then through lead wire 55 and instrument 51, and back through lead wire 53 to inductor droplet 48.

Obviously many modifications and variations of the present invention are possible in the light of the above teachings. It is therefore to be understood that within the scope of the appended claims the invention may be practiced otherwise than as specifically described.

What is claimed is:

1. A method of manufacturing a thin film inductor from an electrical conducting film deposited on one plane surface of a dielectric substrate comprising the steps of:

rotating said substrate about an axis perpendicular to said one plane surface;

applying a scribing tool against said one plane surface of said substrate at a position spaced from the axis of rotation;

moving said tool radially outward at a predetermined rate on said one plane surface of said substrate and along a radius perpendicular to the axis of rotation thereby removing a first spiral strip of conducting film and leaving a second spiral strip of conducting film on said one plane surface of said dielectric substrate; and said scribing tool is a spring tool that moves in a direction perpendicular to said one plane surface of said dielectric substrate to accommodate misalignment of said one plane surface of said dielectric substrate while being rotated.

2. The method of claim 1 wherein:

said spring tool is a wire made of spring steel having a diameter of from about 0.030 to about 0.040 inch and a length of about one inch.

References Cited

UNITED STATES PATENTS

| | | | |
|---|---|---|---|
| 838,423 | 12/1906 | Kitsee | 29—602 |
| 1,582,683 | 4/1926 | Harmon | 29—602 |
| 1,837,678 | 12/1931 | Ryder | 29—602 XR |

LEONIDAS VLACHOS, Primary Examiner

U.S. Cl. X.R.

29—602